United States Patent
Xiong et al.

(10) Patent No.: US 10,632,614 B2
(45) Date of Patent: Apr. 28, 2020

(54) MOTION-CONTROLLING METHOD OF ROBOT AND THE ROBOT THEREOF

(71) Applicant: UBTECH Robotics Corp, Shenzhen (CN)

(72) Inventors: Youjun Xiong, Shenzhen (CN); Gaobo Huang, Shenzhen (CN); Jinbiao Zhang, Shenzhen (CN); Guoke Luo, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 308 days.

(21) Appl. No.: 15/807,587

(22) Filed: Nov. 9, 2017

(65) Prior Publication Data

US 2019/0054616 A1    Feb. 21, 2019

(30) Foreign Application Priority Data

Aug. 21, 2017  (CN) .......................... 2017 1 0720917

(51) Int. Cl.
    *B25J 9/16*  (2006.01)
(52) U.S. Cl.
    CPC .............. *B25J 9/16* (2013.01); *B25J 9/1628* (2013.01); *G05B 2219/39251* (2013.01)
(58) Field of Classification Search
    CPC ... B25J 9/16; B25J 9/1602; B25J 9/161; B25J 9/1628; G05B 2219/39251
    See application file for complete search history.

(56) References Cited

U.S. PATENT DOCUMENTS

| | | | | |
|---|---|---|---|---|
| 5,363,858 A | * | 11/1994 | Farwell ................ | A61B 5/0478 600/544 |
| 5,517,331 A | * | 5/1996 | Murai ................ | H04N 1/32358 358/486 |
| 5,538,352 A | * | 7/1996 | Sugiura .................. | G06K 15/00 400/615.2 |
| 5,890,208 A | * | 3/1999 | Kwon .................. | G06F 3/0601 711/112 |
| 6,487,126 B1 | * | 11/2002 | Kawahara ........ | G11B 20/10527 365/189.05 |
| 9,254,567 B2 | * | 2/2016 | Dai ....................... | G05B 19/056 |
| 2004/0164696 A1 | * | 8/2004 | Yourlo ................ | G05D 1/0272 318/568.11 |
| 2006/0161300 A1 | * | 7/2006 | Gonzalez-Banos ...... | B25J 9/161 700/245 |
| 2006/0288157 A1 | * | 12/2006 | Kinoshita ............. | G06F 3/0613 711/112 |
| 2009/0316007 A1 | * | 12/2009 | Ito ........................... | H04N 5/77 348/207.11 |
| 2015/0148955 A1 | * | 5/2015 | Chin ..................... | G07C 5/008 700/253 |

(Continued)

*Primary Examiner* — Robert T Nguyen

(57) ABSTRACT

The present disclosure relates to a motion-controlling method of a robot and the robot thereof. A main control circuit continuously transmits a controlling instruction to a cache circuit. The controlling instruction may include the controlling information of a specific servo. A driving circuit is configured to obtain and analyze the controlling instruction from the cache circuit, so as to obtain the controlling information of the specific servo. The driving circuit transmits the controlling information to the specific servo to control the specific servo. As such, coherence of the robot may be improved.

16 Claims, 5 Drawing Sheets

Transmitting a controlling instruction to a cache circuit continuously by a main control circuit, wherein the controlling instruction include controlling information for a specific servo — S101

Obtaining the controlling information of the specific servo from the cache circuit by a driving circuit, wherein the driving circuit may obtain and analyze the controlling instruction — S102

Transmitting the controlling information to the specific servo from the driving circuit to control the specific servo — S103

(56) References Cited

U.S. PATENT DOCUMENTS

| | | | |
|---|---|---|---|
| 2018/0173462 A1* | 6/2018 | Choi | G06F 3/0659 |
| 2018/0264651 A1* | 9/2018 | Ojima | B25J 9/046 |
| 2019/0054616 A1* | 2/2019 | Xiong | B25J 9/16 |
| 2019/0129009 A1* | 5/2019 | Eichenholz | G01S 7/4804 |
| 2019/0193265 A1* | 6/2019 | Xiong | B25J 9/1664 |

* cited by examiner

Transmitting the controlling command and the controlling parameter to the specific servo, such that the specific servo may rotate along a predetermined direction by a predetermined angle within a predetermined time — S1031
FIG. 7
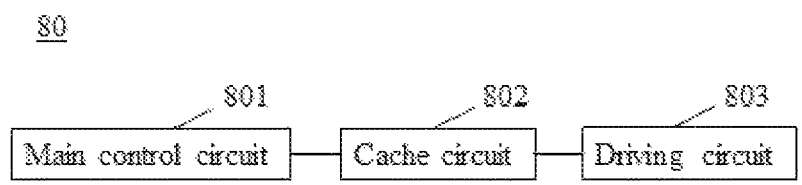
FIG. 8
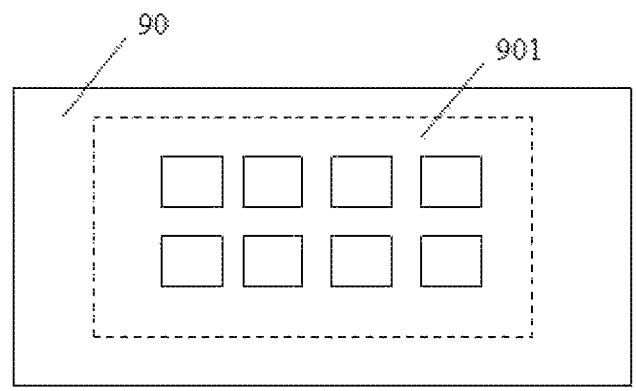
FIG. 9

MOTION-CONTROLLING METHOD OF ROBOT AND THE ROBOT THEREOF

CROSS REFERENCE TO RELATED APPLICATIONS

This application claims priority to Chinese Patent Application No. 201710720917.2, filed Aug. 21, 2017, which is hereby incorporated by reference herein in its entirety.

BACKGROUND

1. Technical Field

The present disclosure relates to robot field, and more particularly to a motion-controlling method of robot and a robot thereof.

2. Description of Related Art

Recently, robot-related technology has been developed rapidly. With respect to the robot having controllable joints, the controlling system and the corresponding hardware may perform functions, such as voice-controlled, face-recognition, and photographing. However, when the robot performs dancing or limb actions, the controlling instructions are often issued from upper applications. The upper applications may transmit next instruction after a servo of the joint completes the previous instruction within a specific time, which may result in incoherence and pause of the limb of the robot.

BRIEF DESCRIPTION OF THE DRAWINGS

FIG. 7 is a flowchart illustrating a motion-controlling method in accordance with a seventh embodiment of the present disclosure.

FIG. 8 is a schematic view of a robot in accordance with one embodiment of the present disclosure.

FIG. 9 is a schematic view of a storage device in accordance with one embodiment of the present disclosure.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

Figure 1:
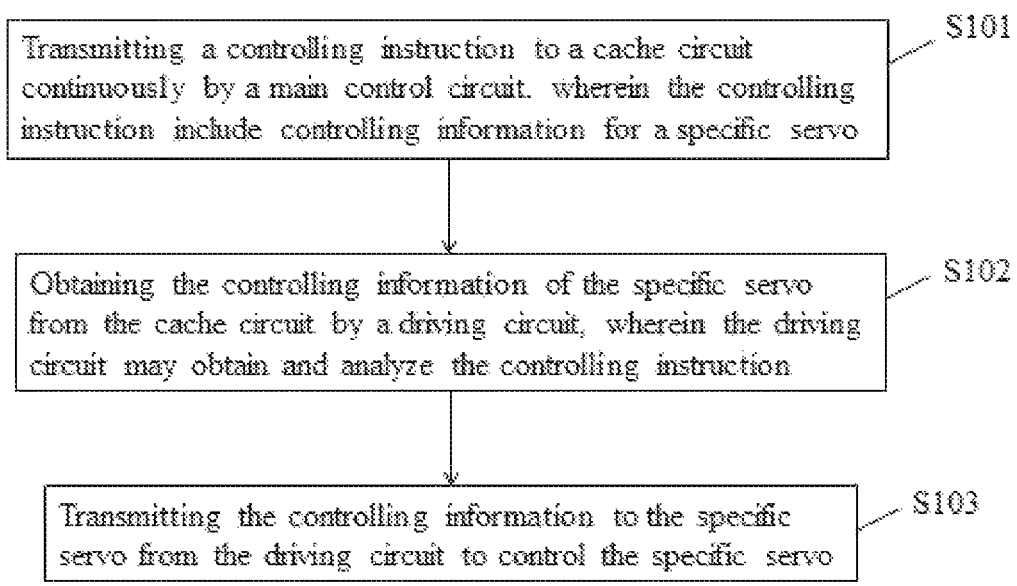
FIG. 1 is a flowchart illustrating a motion-controlling method in accordance with a first embodiment of the present disclosure.

As shown in FIG. 1, the present disclosure relates to a motion-controlling method, including the following steps.

In step S101: transmitting a controlling instruction to a cache circuit continuously by a main control circuit, wherein the controlling instruction include controlling information for a specific servo.

The controlling instruction is configured to control the specific servo, including the controlling information of the specific servo. The main control circuit may operate an operation system, such as Android or Linux. The cache circuit is configured with a storing space, and is configured to store data. In one example, the cache circuit and the main control circuit are integrated on the same circuit board/chip. In another example, the cache circuit and the main control circuit may be configured on different circuit boards/chips.

In one aspect, the robot may perform a certain action according to the instruction of a user. For example, when the robot performs dancing actions, the Android system of the main control circuit may access a corresponding controlling application to generate the controlling instruction corresponding to the servo designated by the robot. For example, the controlling instruction is configured to control the specific servo 11 to rotate along a counter-clockwise direction by 20 degrees within 20 milliseconds (ms). The main control circuit may continuously transmit the controlling instruction to the cache circuit in sequence. Such that, the specific servo may complete the controlling instruction, that is, the specific servo may complete the dancing actions in sequence. In one example, one controlling instruction is configured to control one specific servo to perform one motion operation. In another example, one controlling instruction is configured to control a plurality of servos, or is configured to control one specific servo to perform a plurality of motion operations.

In step S102: obtaining the controlling information of the specific servo from the cache circuit by a driving circuit, wherein the driving circuit may obtain and analyze the controlling instruction.

The controlling information may include controlling commands and controlling parameters. The controlling command may include the command indicating a direction of the specific servo. The controlling parameters may include a target angle and operation time of the specific servo.

In step S103: transmitting the controlling information to the specific servo from the driving circuit to control the specific servo.

Figure 2:
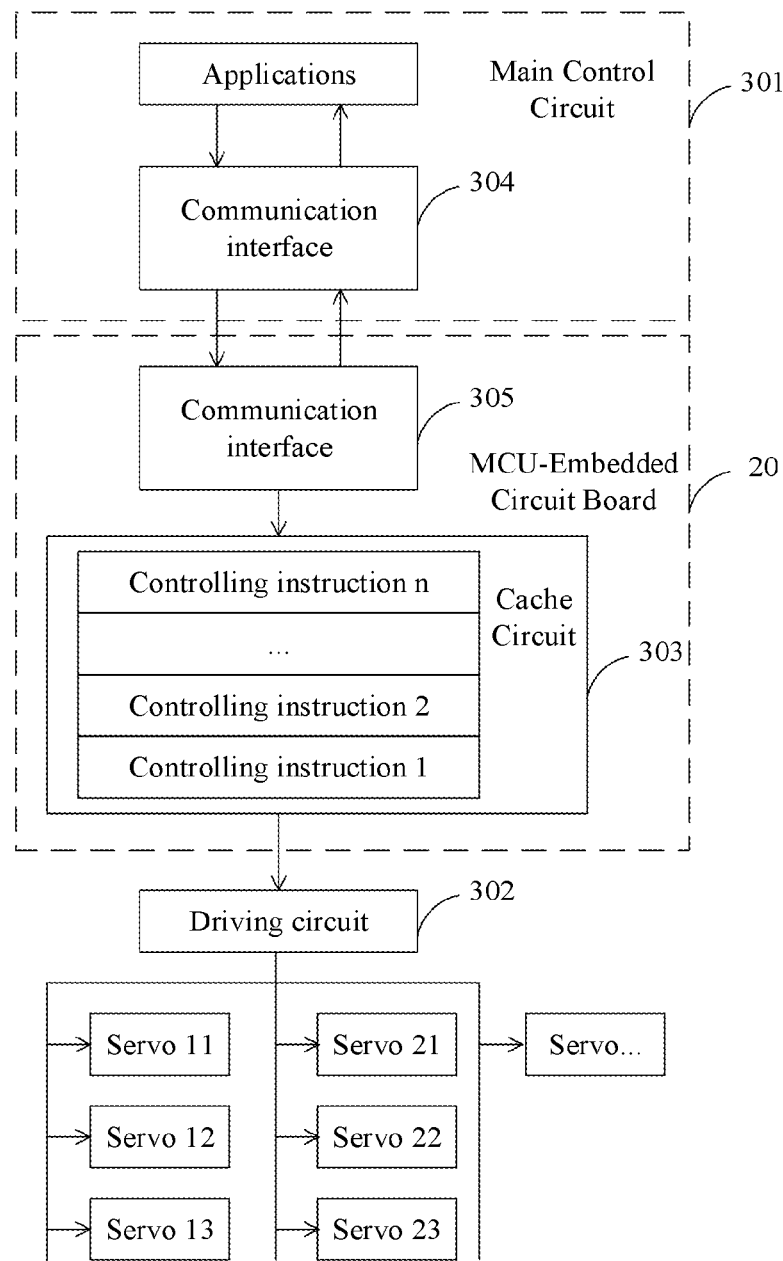
FIG. 2 is a schematic view illustrating a connection between a main control circuit, a cache circuit, and a servo of the present disclosure.

In one example, as shown in FIG. 2, the main control circuit 301, i.e., the circuit board operating Android system may connect with a microcontroller-unit (MCU)-embedded circuit board 20 to control the joints. The MCU-embedded circuit board 20 may include the driving circuit 302 configured to control each of the servos on different limbs. The main control circuit 301 may communicate with the driving circuit 302 via a communication interface, such as a serial port.

Referring to FIG. 2, the cache circuit 303 and the driving circuit 302 are integrated within one MCU-embedded circuit board 20. The Android application operated by the main control circuit 301 continuously transmit the controlling instructions to the MCU-embedded circuit board 20 via the communication interface 304, such as the serial port. The MCU-embedded circuit board 20 is configured to receive the controlling instruction via the communication interface 305 in sequence and to store the controlling instruction to the cache circuit 303. The driving circuit 302 is configured to obtain and analyze the controlling instruction from the cache circuit 303, so as to obtain the controlling information of the specific servo. For example, the controlling information may include: rotating the servo 12 by 30 degrees within 50 ms, and transmitting the controlling information to the specific servo 12 to control the specific servo to complete the control instruction. If the next controlling instruction has been stored the cache circuit 303 after the specific servo completed the previous controlling instruction, the driving circuit 302 may directly obtain the next controlling instruction directly from the cache circuit 303. Wherein the cache circuit 303 may store the controlling instruction in an array format in sequence, that is, the first-inputted controlling instruction is outputted first. As such, the driving circuit 302 may obtain one controlling instruction from a cache array in sequence in one time, so as to complete the action in sequence.

In another example, the main control circuit may operate the Linux system. The cache circuit and the driving circuit may be integrated on the same chip. The cache circuit may be configured between the Android circuit board and the MCU-embedded circuit board. The main control circuit, the cache circuit, and the driving circuit may be integrated on the same circuit board/chip operating the same operation system. For example, a cache area may be configured in a non-application layer (such as a kernel layer) of the Android system, wherein the cache area is configured to store the controlling instruction. In another example, the cache circuit may store the controlling instruction in different manner, and it's not limited in the present disclosure.

In view of the above, the main control circuit continuously transmits the controlling instructions to the cache circuit. The controlling instruction may include the controlling information of the specific servo. The driving circuit is configured to obtain and analyze the controlling instruction from the cache circuit, so as to obtain the controlling information of the specific servo. The driving circuit transmits the controlling information to the specific servo to control the specific servo. As such, the transmission of the controlling instruction is not related to the execution of the controlling instruction. The main control circuit may continuously transmit the next controlling instruction to the cache circuit before the servo completes the previous controlling instruction. Such that, the driving circuit may obtain the controlling instruction directly from the cache circuit, so as to reduce waiting time of the main control circuit and the driving circuit, to improve performance of the servo, and to improve coherence of the robot.

Figure 3:
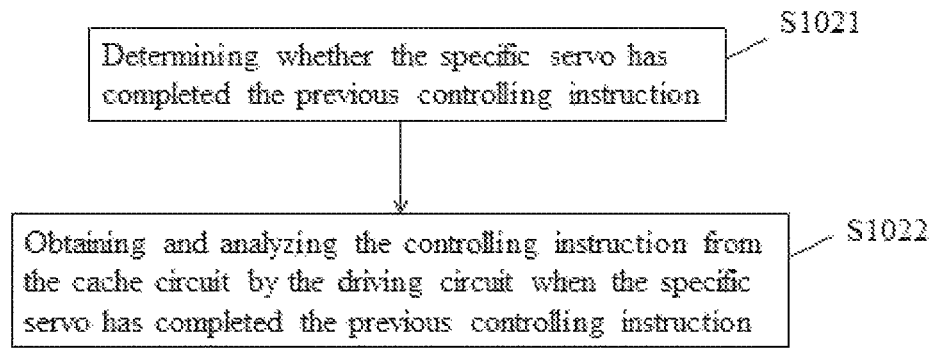
FIG. 3 is a flowchart illustrating a motion-controlling method in accordance with a second embodiment of the present disclosure.

As shown in FIG. 3, the step S102 may further include the following step.

In step S1021: determining whether the specific servo has completed the previous controlling instruction.

Specifically, when the driving circuit transmits the next controlling instruction, the driving circuit may determine whether the specific servo has completed the previous controlling instruction. For example, the driving circuit may detect a current angle of the servo via a detection device, such as an angle sensor, and may determine whether the current angle is equal to an angle configured by the previous controlling instruction. If the current angle is equal to the angle configured by the previous controlling instruction, it is determined that the previous controlling instruction has been completed.

In another example, when the servo rotates to an angle indicated by the previous controlling instruction or when the servo is within a range indicating by the previous controlling instruction, it is determined that the servo has completed the previous controlling instruction.

In step S1022: obtaining and analyzing the controlling instruction from the cache circuit by the driving circuit when the specific servo has completed the previous controlling instruction.

Specifically, the driving circuit may obtain the next controlling instruction from the cache circuit, and may analyze the controlling information of the specific servo to control the specific servo when the driving circuit determines the specific servo has completed the previous controlling instruction. If the driving circuit determines the specific servo has not completed the previous controlling instruction, the driving circuit may re-determine after a predetermined time. For example, the predetermined time may be 10 ms.

In another example, the specific servo may transmit a notification message to the driving circuit after the specific servo has completed the controlling instruction. As such, the driving circuit may obtain the next controlling instruction from the cache circuit after receiving the notification message. The driving circuit may transmit a terminating operation instruction to the specific servo, and obtain the next controlling instruction.

Figure 4:
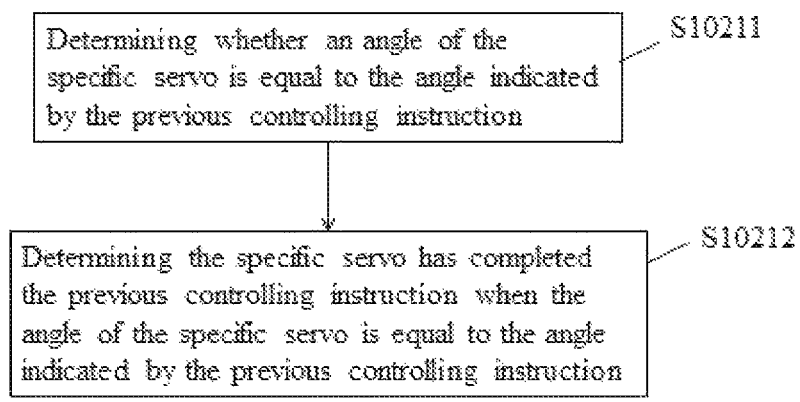
FIG. 4 is a flowchart illustrating a motion-controlling method in accordance with a third embodiment of the present disclosure.

As shown in FIG. 4, the step S1021 may further include the following steps.

In step S10211: determining whether an angle of the specific servo is equal to the angle indicated by the previous controlling instruction.

In step S10212: determining the specific servo has completed the previous controlling instruction when the angle of the specific servo is equal to the angle indicated by the previous controlling instruction.

Specifically, the driving circuit may detect a difference between the current angle and an angle before conducting the controlling instruction via the detection device, such as the angle sensor. That is, to determine whether the angle of the servo is equal to the angle indicating by the previous controlling instruction. If the angle of the servo is equal to the angle indicating by the previous controlling instruction, it is determined the servo has completed the previous controlling instruction. The driving circuit may obtain the next controlling instruction.

For example, if the previous controlling instruction is to rotate the servo by 30 degrees within 200 ms, a predetermined angle is configured to be 30 degrees. When the driving circuit detects the current angle is at 120 degrees via the angle sensor 13, the angle before conducting the previous instruction is at 90 degrees, and the difference is 30 degrees. That is, the servo is rotated by 30 degrees, which is equal to the predetermined angle. As such, it is determined the servo has completed the previous controlling instruction.

In another example, the driving circuit may directly obtain an angle that has been rotated by the specific servo via the detection device or via data uploaded from the servo.

Figure 5:
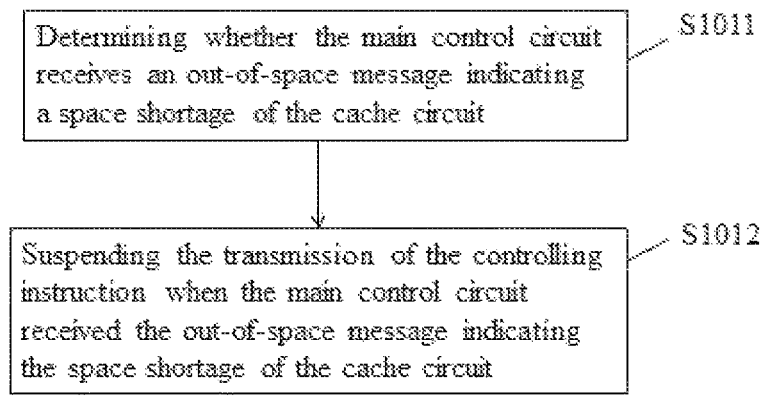
FIG. 5 is a flowchart illustrating a motion-controlling method in accordance with a fourth embodiment of the present disclosure.

As shown in FIG. 5, the step S101 may further include the following steps.

In step S1011: determining whether the main control circuit receives an out-of-space message indicating a space shortage of the cache circuit.

In one example, the storage space of the cache circuit may be, for example, 100 megabit (MB).

In step S1012: suspending the transmission of the controlling instruction when the main control circuit receives the out-of-space message indicating the space shortage of the cache circuit.

In one example, the cache circuit may transmit the out-of-space message indicating the space shortage of the cache circuit when there is no storage space the cache circuit, or when the storage space is less than a predetermined threshold value (for example, 10 bit), or when the used storage space is greater than a predetermined threshold value (for example, 99.5 MB). When the main control circuit receives the out-of-space message indicating the space shortage of the cache circuit from the cache circuit, the main control circuit may suspend the transmission of the controlling instruction. Wherein the predetermined threshold value and suspending time may depend on the user.

In another example, the main control circuit may periodically detect the storage space of the cache circuit. When detecting the space shortage of the cache circuit, the main control circuit may suspend the transmission of the controlling instruction. Or the cache circuit may periodically transmit a status message indicating a remaining space of the cache circuit, and the main control circuit may determine whether the space is shortage according to the message.

Figure 6:
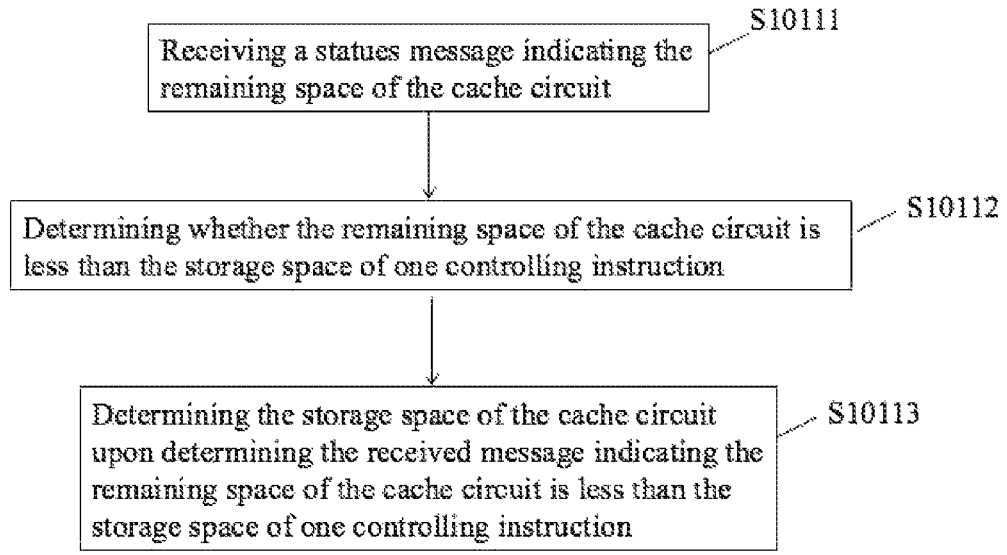
FIG. 6 is a flowchart illustrating a motion-controlling method in accordance with a fifth embodiment of the present disclosure.

As shown in FIG. 6, the step S1011 further includes the following steps.

In step S0111: receiving the status message indicating the remaining space of the cache circuit.

In one example, the cache circuit may periodically transmit the status message indicating the remaining space to the main control circuit. The status message may indicate the used space and the remaining space. In another example, the main control circuit may transmit a check message to the cache circuit to check the remaining space. The cache circuit may transmit the status message indicating the remaining space to the main control circuit when the cache circuit receives the check message.

In step S10112: determining whether the remaining space of the cache circuit is less than the storage space of one controlling instruction.

In step S10113: determining the storage space of the cache circuit upon determining the received message indicating the remaining space of the cache circuit is less than the storage space of one controlling instruction.

Wherein the storage space of one controlling instruction may be a predetermined value or may be in a range.

In one example, the storage space of one controlling instruction may be 20 bit. If the remaining space of the cache circuit is 10 bit, it is determined that the remaining space of the cache circuit is less than the storage space of one controlling instruction. The main control circuit may receive the out-of-space message indicating the space shortage of the cache circuit.

In another example, the storage space of one controlling instruction may be different. The main control circuit may compare the storage space of the next controlling instruction with the remaining space of the cache circuit to determine whether the storage space is enough. Or when the storage space of the controlling instruction in a range, such as from 10 bit to 50 bit, the main control circuit may configure a maximum value to be the storage space of one controlling instruction, and may compare the maximum value of the range with the remaining space of the cache circuit to determine whether the storage space is enough.

As show in FIG. 7, the step S103 may further include the following steps.

In step S1031: transmitting the controlling command and the controlling parameter to the specific servo, such that the specific servo may rotate along a predetermined direction by a predetermined angle within a predetermined time.

The controlling information of the specific servo may include the controlling command and the controlling parameter. The controlling command may include a command indicating a direction of the servo. The controlling parameters may include the target angle and operation time of the specific servo.

In one example, the driving circuit may obtain the controlling information of the specific servo after analyzing the controlling instruction. The controlling instruction may include an controlling command controlling the servo 11 to rotate along the predetermined direction, such as clockwise direction, by the predetermined angle (for example, 30 degrees) within the predetermined time (for example, 10 ms). The driving circuit may transmit the controlling information to the specific servo 11. The specific servo may receive the controlling information and perform an action indicating by the controlling information, that is, rotating along the clockwise direction with a speed of 3 degrees per second within 10 ms. In another example, the speed of the servo may be different within one action, as long as the servo is able to reach the predetermined angle within the predetermined time.

In another example, the controlling parameter may only include a portion of the parameters, or may further include other parameters depending on the user.

As shown in FIG. 8, the present disclosure further relates to a robot, including a main control circuit 801, a cache circuit 802, and a driving circuit 803.

The cache circuit 802 is configured to store the controlling instruction, including the controlling command and the controlling parameter.

Wherein the main control circuit 801 and the driving circuit 803 are configured to conduct one or the combination of the steps described in above.

In one example, the cache circuit 802 and the driving circuit 803 may be integrated on the same chip or the same circuit board, such as MCU-embedded circuit board. The main control circuit 801 may be the chip operating the Android or the Linux system, such as a central processing unit (CPU) chip. Or the main control circuit 801 may be the circuit board operating the Android or the Linux system, such as an advanced RISC machine (ARM) board. In another example, the main control circuit 801, the cache circuit 802, and the driving circuit 804 may be integrated on the same chip, such as the CPU chip.

In another example, each servos of the robot may further include an image capturing device and a voice device (not shown).

In view of the above, the main control circuit continuously transmits the controlling instruction to the cache circuit. The controlling instruction may include the controlling information of the specific servo. The driving circuit is configured to obtain and analyze the controlling instruction from the cache circuit, so as to obtain the controlling information of the specific servo. The driving circuit transmits the controlling information to the specific servo to control the specific servo. As such, the transmission of the controlling instruction is not related to the execution of the controlling instruction. The main control circuit may continuously transmit the next controlling instruction to the cache circuit before the servo completes the previous controlling instruction. Such that, the driving circuit may obtain the controlling instruction directly from the cache circuit, so as to reduce waiting time of the main control circuit and the driving circuit, to improve performance of the servo, and to improve coherence of the robot.

As shown in FIG. 9, the present disclosure further relates to a storage device 90 configured to store a plurality of applications 901. The applications 901 may be conducted to perform one or the combination of the steps described in above.

Wherein the storage device 90 may be a portable storage media, such as flash drive, CD-ROM, mobile terminal, server and chip.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A motion-controlling method of a robot, comprising:
transmitting at least one controlling instruction to a cache circuit continuously by a main control circuit, wherein the controlling instruction comprises controlling information for a specific servo;
determining whether the specific servo has completed the previous controlling instruction;
obtaining the controlling information of the specific servo from the cache circuit by a driving circuit upon determining the specific servo has completed the previous controlling instruction; and
transmitting the controlling information to the specific servo from the driving circuit to control the specific servo.

2. The motion-controlling method according to claim 1, wherein the determining step further comprises:
determining whether an angle of the specific servo is equal to an angle indicated by the previous controlling instruction; and
determining the specific servo has completed the previous controlling instruction when the angle of the specific servo is equal to the angle indicated by the previous controlling instruction.

3. The motion-controlling method according to claim 1, wherein the step of transmitting the controlling instruction to the cache circuit further comprises:
determining whether the main control circuit receives an out-of-space message indicating a space shortage of the cache circuit;
suspending the transmission of the controlling instruction when the main control circuit receives the out-of-space message.

4. The motion-controlling method according to claim 3, wherein the step of determining whether the main control circuit receives the out-of-space message indicating the space shortage of the cache circuit further comprises:
receiving a status message indicating a remaining space of the cache circuit by the main control circuit;
determining whether the remaining space of the cache circuit is less than the storage space of one controlling instruction according to the status message;
generating the out-of-space message upon determining the remaining space is less than the storage space of one controlling instruction.

5. The motion-controlling method according to claim 1, wherein the controlling information of the specific servo comprises a controlling command and a controlling parameter.

6. The motion-controlling method according to claim 5, wherein the controlling command comprises a command indicating a direction of the servo, and the controlling parameters comprise a target angle and operation time of the specific servo; and
the step of transmitting the controlling information to the specific servo by the driving circuit to control the specific servo further comprises:
transmitting the controlling command and the controlling parameter to control the specific servo to rotate along a predetermined direction by a predetermined angle within a predetermined time.

7. The motion-controlling method according to claim 1, wherein the driving circuit and the cache circuit are integrated on a chip, and the cache circuit is configured to store the controlling instruction in an array format.

8. The motion-controlling method according to claim 1, wherein the main control circuit, the driving circuit, and the cache circuit are integrated on a chip.

9. A robot, comprising:
a main control circuit, a cache circuit, and a driving circuit connecting in sequence;
wherein the main control circuit is configured to:
transmit at least one controlling instruction to a cache circuit continuously, wherein the controlling instruction comprises controlling information for a specific servo; and
determine whether the specific servo has completed the previous controlling instruction; and
the driving circuit is configured to:
obtain the controlling information of the specific servo from the cache circuit by upon the main control circuit determining the specific servo has completed the previous controlling instruction; and
transmit the controlling information to the specific servo to control the specific servo.

10. The robot according to claim 9, wherein the main control circuit is further configured to:
determine whether an angle of the specific servo is equal to an angle indicated by the previous controlling instruction; and
determine the specific servo has completed the previous controlling instruction when the angle of the specific servo is equal to the angle indicated by the previous controlling instruction.

11. The robot according to claim 9, wherein the main control circuit is further configured to:
determine whether the main control circuit receives an out-of-space message indicating a space shortage of the cache circuit; and
suspend the transmission of the controlling instruction when the main control circuit receives the out-of-space message.

12. The robot according to claim 11, wherein the main control circuit is further configured to:
receive a status message indicating a remaining space of the cache circuit;

determine whether the remaining space of the cache circuit is less than the storage space of one controlling instruction according to the status message; and generate the out-of-space message upon determining the remaining space is less than the storage space of one controlling instruction.

13. The robot according to claim 9, wherein the controlling information of the specific servo comprises a controlling command and a controlling parameter.

14. The robot according to claim 13, wherein the controlling command comprises a command indicating a direction of the servo, and the controlling parameters comprise a target angle and operation time of the specific servo; and the driving circuit is further configured to transmit the controlling command and the controlling parameter to control the specific servo to rotate along a predetermined direction by a predetermined angle within a predetermined time.

15. The robot according to claim 9, wherein the driving circuit and the cache circuit are integrated on a chip, and the cache circuit is configured to store the controlling instruction in an array format.

16. The robot according to claim 9, wherein the main control circuit, the driving circuit, and the cache circuit are integrated on a chip.

* * * * *